May 6, 1924.                                                                    1,492,819
H. H. TIMIAN
TRANSMISSION GEARING
Filed Dec. 4, 1919                    2 Sheets-Sheet 1
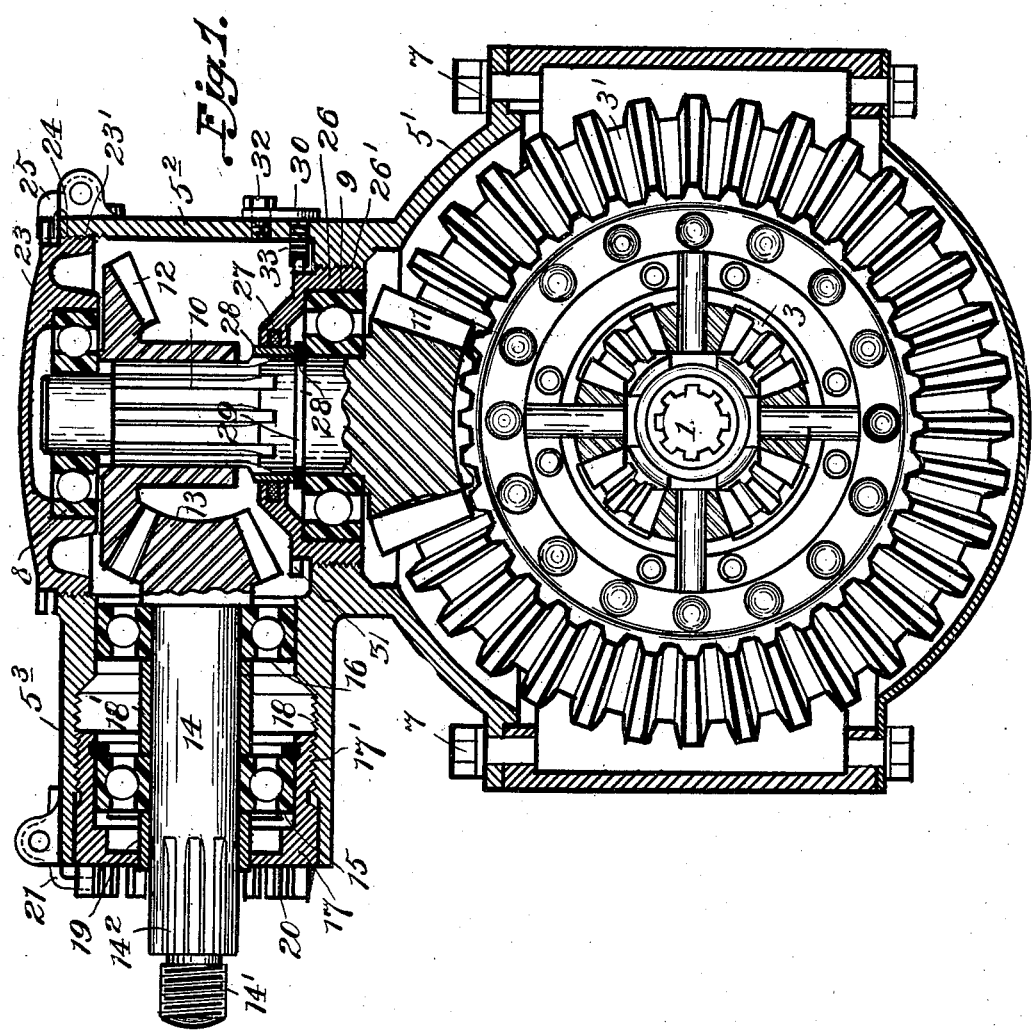
INVENTOR.
Harold H Timian
BY
Milans & Milans
ATTORNEY

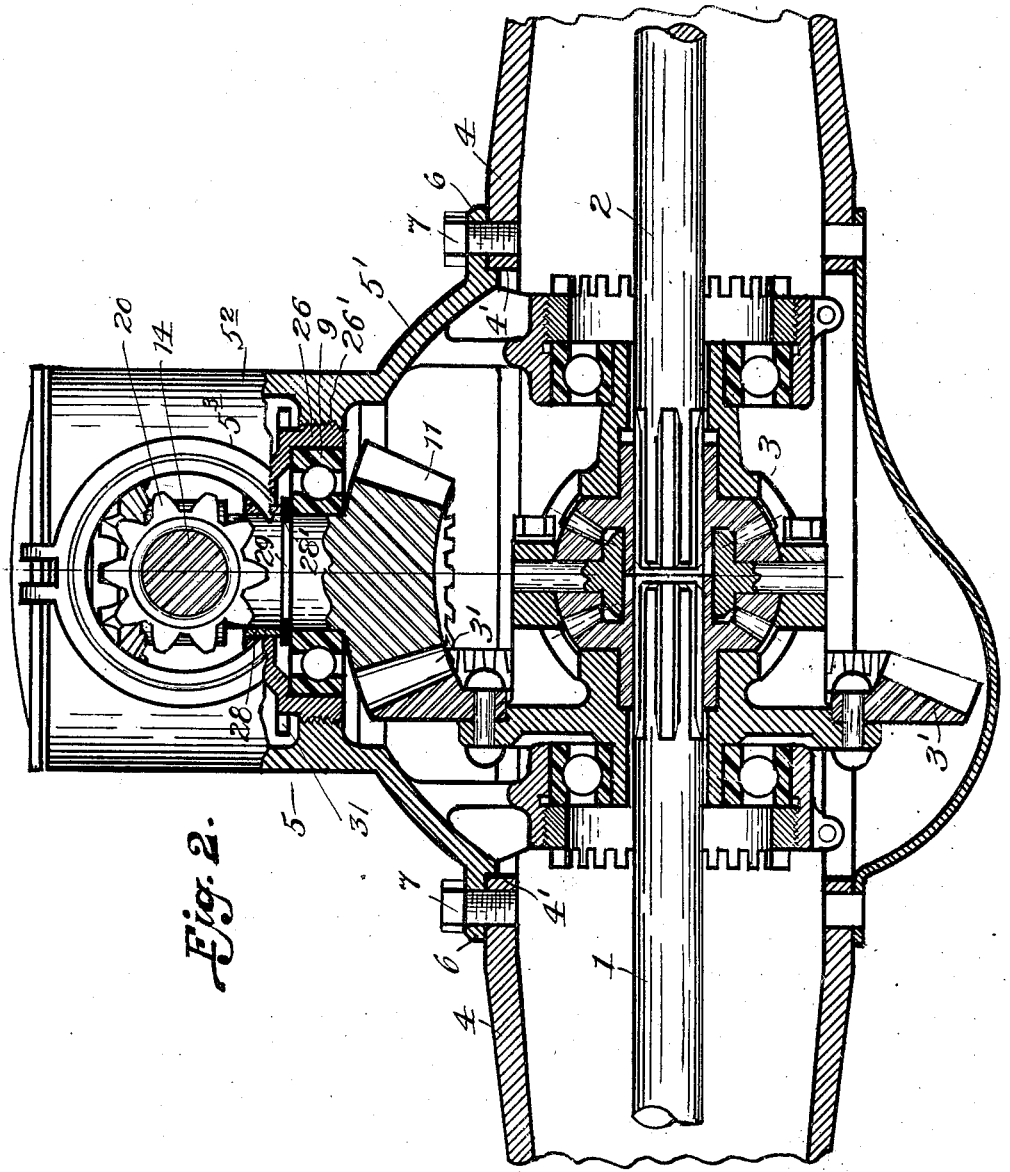

Patented May 6, 1924.

1,492,819

UNITED STATES PATENT OFFICE.

HAROLD HUBBARD TIMIAN, OF KOKOMO, INDIANA, ASSIGNOR OF ONE-HALF TO FRANK V. ELBERTZ, OF KOKOMO, INDIANA.

TRANSMISSION GEARING.

Application filed December 4, 1919. Serial No. 342,525.

*To all whom it may concern:*

Be it known that I, HAROLD H. TIMIAN, a citizen of the United States, residing at Kokomo, in the county of Howard and State of Indiana, have invented certain new and useful Improvements in Transmission Gearing, of which the following is a specification, reference being had therein to the accompanying drawing.

This invention relates to improvements in transmission gearing, and more especially to transmission gearing particularly adapted for low speed vehicles such as trucks, traction engines, and the like, in which a large reduction in speed is required between the motor shaft and axles.

The object of the invention is to provide an improved transmission gearing of simple, cheap, compact construction that will afford the desired reduction in speed between the driving shaft and the driven shaft or axles without requiring the use of an unduly large driving gear or pinion for the driven shaft or axles, by means located adjacent to and adapted to be housed with the differential or other gear directly associated with the driven shaft or axles.

Another object of the invention is to provide an improved transmission gearing with speed reduction means of the character referred to constructed in the form of a unitary structure adapted to be readily applied to the standard types of differential gear equipment, to be conveniently handled as a single part, and readily assembled with and disconnected from the motor shaft and differential gear.

A still further object of the invention is to provide improved speed reducing means of the nature referred to that is adapted to be used with a motor vehicle continuous or line shaft drive, and in which provision is made for the convenient dismounting and adjustment of the parts.

The invention, with other objects and advantages thereof, and the particular construction, combination, and arrangement of parts comprising the same, will be understood from the following detailed description when considered in connection with the accompanying drawings, forming part thereof, and illustrating one embodiment of the invention.

In the drawings:—

Figure 1 is a central transverse vertical section of a transmission gearing constructed in accordance with the present invention.

Figure 2 is a vertical section taken on a line at right angles to that of Figure 1.

While I have illustrated in the drawings, by way of example, a specific embodiment of the invention, it will, of course, be understood that minor changes and obvious variations in the particular construction shown, and the carrying out of the invention in other forms, as will appeal to those skilled in the art and falling within the scope of the appended claims, may be practiced without departing from the spirit of the invention.

The invention comprehends the provision of reduction gearing between the motor shaft and propeller shaft located adjacent to and adapted to be housed with the differential gear. The invention further contemplates the provision of such reduction means in the form of a single unitary structure comprising a supporting part or casing section upon which the reduction gearing is mounted and carried, and which is adapted to be detachably connected with the usual housing for the differential gearing and axles.

In the drawings, 1—2 designate axle sections, 3 a differential gear associated therewith and having a main driving beveled pinion 3′, and 4 a casing therefor, all of well known construction.

In accordance with the present invention, a support 5 is provided, upon which is carried the reduction gear and which is adapted to be detachably secured to the casing 4. The support 5, which preferably takes the form of an auxiliary casing part or section, is shown as comprising a partly spherical lower portion or base 5′, an adjoining vertically extending portion $5^2$, and a portion $5^3$ extending at right angles to the portion $5^2$, the casing 4 having an opening 4′ at its upper side, and the lower portion or base 5′ having a flange 6 to rest upon and be detachably secured by bolts 7 or equivalent fastening means to a flange of the casing 4.

Supported for rotation in the bearings 8—9 in the portion $5^2$ of the detachable casing part 5 is a propeller shaft 10, said propeller shaft, in the particular construction shown, extending vertically when the casing section 5 is secured in place on the casing 4, and having at its lower end a beveled pinion 11 meshing with the main beveled drive pinion 3 of the differential gear.

The reduction gearing includes a beveled pinion 12 fixed on the propeller shaft 10 near the upper end thereof, and a similar beveled pinion 13 in mesh therewith and fixed on one end of a shaft 14 supported in bearings 15—16 in the portion 5³ of the detachable casing part 5 and extending at right angles to the propeller shaft in line with the motor shaft (not shown), and provided with threaded portion 14′ and splines 14², constituting means for coupling the same with the hub of the universal joint of the motor shafting.

In order to provide for the easy assembling, removal and adjustment of the reduction gearing, the rear bearing 15 of the shaft 14 is carried by a sleeve 17, which has a threaded part 17′ detachably engaging an internally threaded portion 18 on the portion 5³ of the detachable casing section 5. 18′—19 designate spacing sleeves interposed between the bearing 15 and the hub of the universal joint of the motor shafting. By turning or rotating the sleeve 17, the shaft 14 and beveled gear 13 can be adjusted relatively to the large reduction gear 12, and by removing the sleeve 17, the shaft 14 and gear 13 may be readily removed, the motor shafting being first uncoupled from the outer end of the shaft. 20 designates teeth arranged on the sleeve 17, and 21 is a lock pin detachably secured to the casing portion 5³ by a screw or bolt 22.

The upper bearing 8 for the propeller shaft 10 is carried by an adjustable and removable cap 23, the cap 23 having a threaded portion 23′ engaging an interiorly threaded portion 24 on the portion 5² of the casing section 5. The cap 23 has teeth 24, and 25 is a lock pin to cooperate therewith. The lower bearing 9 for the propeller shaft is carried by a sleeve 26, the sleeve 26 having a threaded portion 26′ engaging an interiorly threaded part of the portion 5² of the casing. 27 designates a washer of felt or the like, and 28 is a thimble interposed between the washer and the adjacent portion of the propeller shaft 10, said thimble 28 being shown resting upon a removable split ring 28′, which engages a groove 29 in the propeller shaft. 30 designates a lock pin to cooperate with lock teeth 31 on the sleeve 26, the lock pin 30 being in the form of a plate detachably secured to the wall of the portion 5² of the casing by a screw or similar fastening means 32, and having a part 33 adapted to project within the casing portion 5² in engagement with the lock teeth. The cap 23 affords ready access to the interior of the casing section 5, and by removing or adjusting the cap 23 and sleeve 26, the propeller shaft 10 can be removed or adjusted.

It will be noted that the special construction and arrangement of parts hereinbefore described affords a simple, compact structure, one that can be manufactured at little expense, is adapted for use with the continuous or line motor shafting commonly employed and the standard types of differential gear and casing equipment, that can be conveniently handled as a single unit or part, and provides for the ready assembling, dismounting, and interchangeability or use of different reduction gearing.

What I claim is:—

1. In a transmission gearing, the combination with a differential gear, of a casing for the same, propeller and motor shafts, reduction gearing interposed between said shafts respectively for transmitting power to the driving pinion of the differential gear, a casing section for enclosing a portion of said differential gear comprising a vertically extending cylindrical portion, and a cylindrical portion extending at right angles thereto detachably secured to said casing, a sleeve member within the last-mentioned portion of said casing section forming a bearing for said motor shaft, and means upon said casing section and sleeve member respectively for preventing disengagement of the latter.

2. In a transmission gearing, the combination with a differential gear, of a casing for the same, propeller and motor shafts, reduction gearing interposed between said shafts for transmitting power to the driving pinion of the differential gear, a casing section for enclosing a portion of said differential gear comprising a vertically extending portion and a portion extending at right angles thereto, threads upon each of said portions, a sleeve member forming a bearing for said motor shaft and threadedly engaging said right-angled portion of said casing section, teeth upon the end of said sleeve member, and a member upon said last-mentioned portion engaging said teeth to securely lock said sleeve member.

3. In transmission gearing, the combination with a differential gear, of a casing for the same, a casing section for enclosing a portion of said differential gear comprising a substantially vertical portion and a portion extending at right angles thereto detachably secured to said casing, propeller and motor shafts, means for adjustably mounting said shafts in said portions, reduction gearing interposed between said shafts for transmitting power to the driving pinion of said differential gearing, and a cap member detachably engageable with said casing, and adapted to receive a bearing upon which one end of said propeller shaft is mounted.

4. In transmission gearing, the combination with a differential gear, of a casing therefor, a casing section detachably secured thereto, motor and propeller shafts mounted in said casing section, a threaded bearing mounted within said casing section for receiving said propeller shaft and means extending through the wall of said casing section and engaging said bearing to maintain the same in a predetermined position.

In testimony whereof I hereunto affix my signature in the presence of two witnesses.

HAROLD HUBBARD TIMIAN.

Witnesses:
WM. I. SEARLES,
REBA K. PLUMMER.